(12) United States Patent
Stickle et al.

(10) Patent No.: US 9,846,899 B1
(45) Date of Patent: Dec. 19, 2017

(54) DYNAMIC SOFTWARE LICENSING

(75) Inventors: Thomas C. Stickle, Saint James, NY (US); Brian M. Matsubara, Seattle, WA (US); Ryan C. Holland, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 91 days.

(21) Appl. No.: 13/601,608

(22) Filed: Aug. 31, 2012

(51) Int. Cl.
| | |
|---|---|
| G06Q 30/06 | (2012.01) |
| G06Q 10/10 | (2012.01) |
| G06Q 10/08 | (2012.01) |
| G06F 21/10 | (2013.01) |

(52) U.S. Cl.
CPC ............. *G06Q 30/06* (2013.01); *G06F 21/10* (2013.01)

(58) Field of Classification Search
USPC .................................... 717/177; 705/1.1–912
See application file for complete search history.

(56) References Cited

U.S. PATENT DOCUMENTS

| | | | | |
|---|---|---|---|---|
| 7,343,297 B2* | 3/2008 | Bergler et al. | ........... | 705/59 |
| 7,359,955 B2* | 4/2008 | Menon et al. | ........... | 709/219 |
| 7,814,023 B1* | 10/2010 | Rao et al. | ........... | 705/59 |
| 7,966,520 B2* | 6/2011 | Walker et al. | ........... | 714/15 |
| 8,290,874 B2* | 10/2012 | Evans et al. | ........... | 705/59 |
| 8,371,855 B1* | 2/2013 | Gayles et al. | ........... | 434/51 |
| 8,566,960 B2* | 10/2013 | Richardson | ........... | 726/32 |
| 8,578,152 B2* | 11/2013 | Parkinson | ........... | 713/158 |
| 2002/0073046 A1* | 6/2002 | David | ........... | 705/67 |
| 2002/0152318 A1* | 10/2002 | Menon et al. | ........... | 709/231 |
| 2002/0184161 A1* | 12/2002 | Chang | ........... | 705/59 |
| 2004/0093599 A1* | 5/2004 | Reynaud | ........... | 717/177 |
| 2006/0106727 A1* | 5/2006 | Yellai et al. | ........... | 705/59 |
| 2006/0242080 A1* | 10/2006 | Van Dyke et al. | ........... | 705/59 |
| 2007/0124252 A1* | 5/2007 | Higashi et al. | ........... | 705/59 |
| 2008/0183625 A1* | 7/2008 | Onders | ........... | 705/59 |
| 2011/0197287 A1* | 8/2011 | Hess et al. | ........... | 726/30 |
| 2011/0314556 A1* | 12/2011 | Dicke et al. | ........... | 726/27 |

* cited by examiner

*Primary Examiner* — Jonathan Ouellette
(74) *Attorney, Agent, or Firm* — Klarquist Sparkman, LLP

(57) ABSTRACT

A licensing service is disclosed that can be used in a virtual environment. A master license can be used by the licensing service to maintain a pool of licenses associated with a customer number. Multiple ephemeral licenses can be issued from the pool. The ephemeral licenses can have a short duration to ensure periodic renewal of the ephemeral licenses during the life of the master license. Tighter control of the licenses ensures that the ephemeral licenses are only used during the life of the master license. Additionally, autoscaling is promoted through the use of the license pool, which can adapt according to actual use.

29 Claims, 10 Drawing Sheets

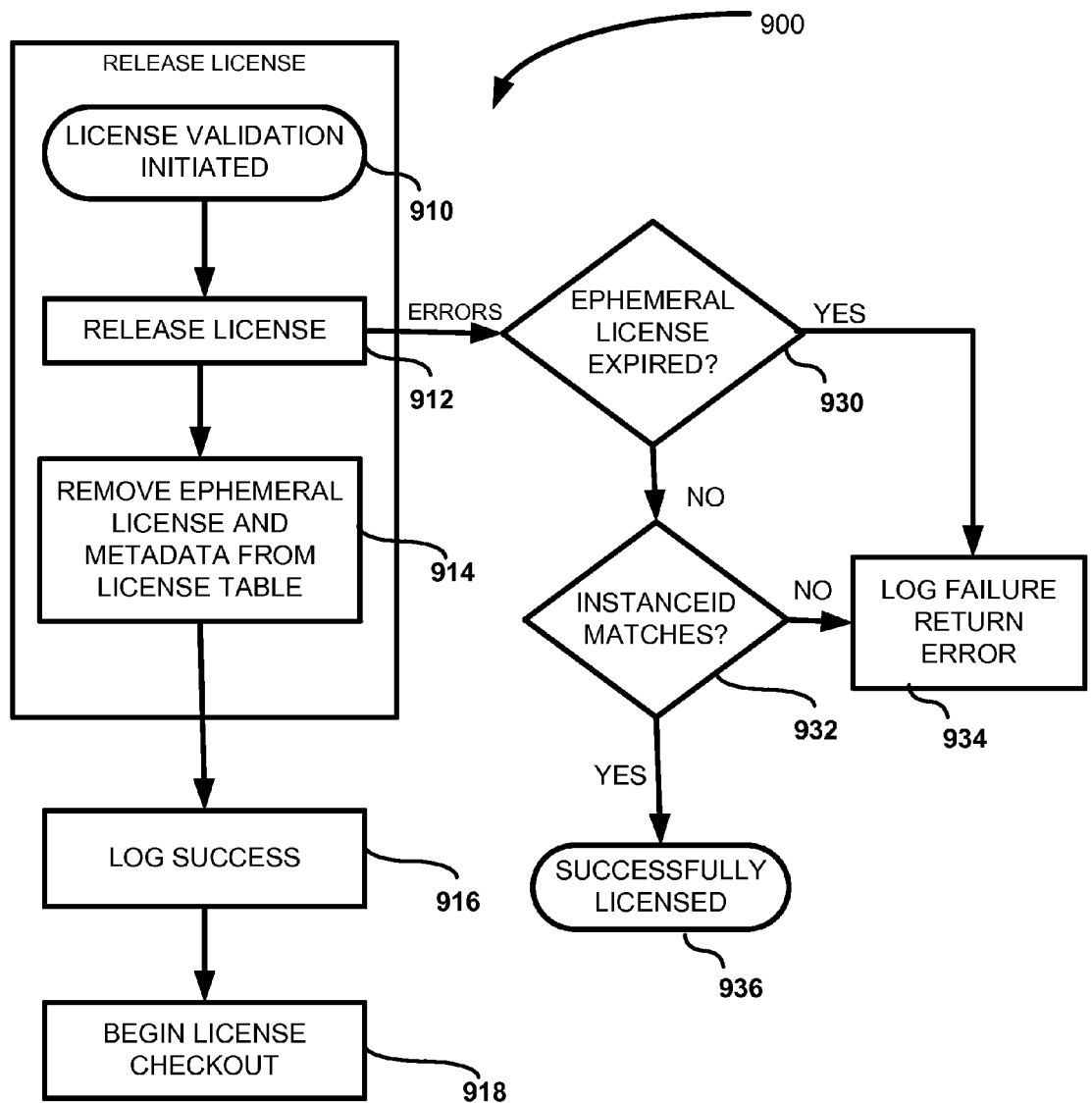

DYNAMIC SOFTWARE LICENSING

BACKGROUND

Software licensing and pricing models are generally not lauded as intuitive, simple, or user-friendly. The value of a software license can be estimated based upon multiple factors including a number of users, a size of the system measured in terms of a number of processors, etc. A typical scenario for licensing software includes tying the software to a particular client computer and confirming a unique identifier (e.g., MAC address) associated with that computer.

As virtualized environments become more important, traditional approaches to licensing begin to fail. Unfortunately, many suppliers have chosen to continue offering only restrictive licenses or conditions of use. However, the restrictions that make sense in a physical world, do not necessarily translate to a virtual or cloud environment. For example, in virtualized and cloud computing environments, it is very hard to tie the use of a specific instance of a software tool or application to a customer as software instances run in an abstracted environment that can grow or shrink as needed. This stresses many suppliers licensing and pricing models.

BRIEF DESCRIPTION OF THE DRAWINGS

FIG. 9 is a detailed flowchart of an embodiment for releasing a license from a license pool.

DETAILED DESCRIPTION

A licensing service is described further below that can be used in a virtual environment. A master license can be used by the licensing service to maintain a pool of licenses associated with a customer number. Multiple ephemeral licenses can be issued from the pool. The ephemeral licenses can have a short duration to ensure periodic renewal of the ephemeral licenses during the life of the master license. Tighter control of the ephemeral licenses ensures that the licenses are only used during the life of the master license.

Figure 1:
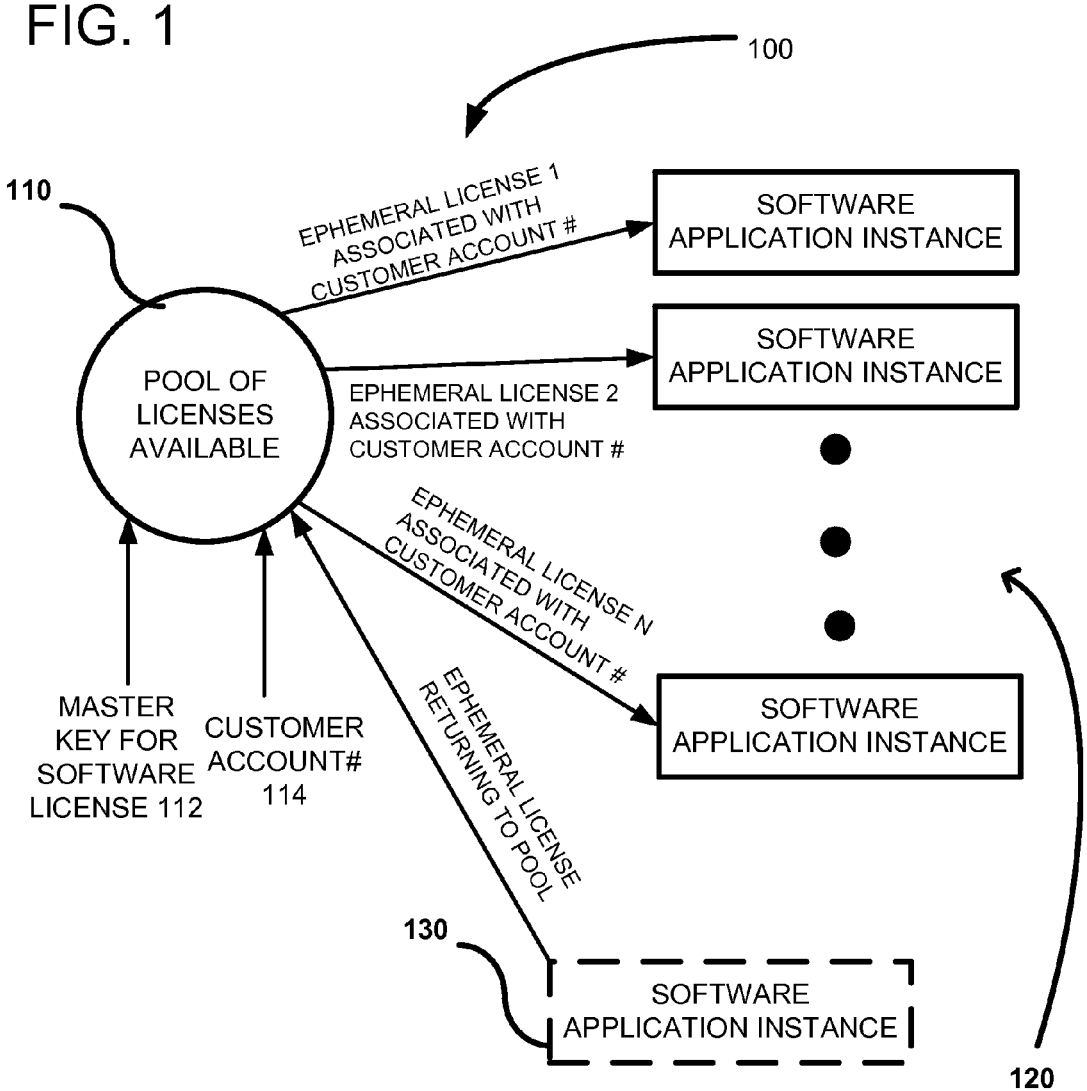
FIG. 1 is a system diagram showing a pool of licenses tied to a customer account and ephemeral licenses being checked in and out of the pool of available licenses.

FIG. 1 is an example diagram illustrating a dynamic licensing scheme 100 for a virtual environment. By dynamic, it is meant that the licensing scheme is an automated process. In some embodiments, a licensor issues a pool of licenses 110 that are associated with a master license key 112 from a master license. The pool of licenses is maintained by a licensing service (not shown) and can include any predetermined and agreed upon number of licenses. The pool of licenses is adaptable to different volume licensing models established between the licensor and an end user (i.e., customer). The licenses can have a duration or time limit associated with the master license key 112 and controlled by the software license. The master key 112 can have a string of numbers, letters and/or symbols, as is well understood in the art. A customer account number 114 can be associated with the pool of licenses and tied to a plurality of software application instances, shown generally at 120, up to the pool limit. In one embodiment, a plurality of ephemeral licenses 1–N (where N is any number) are generated for the software application instances 120. The ephemeral licenses 1–N can have ephemeral license keys associated therewith that authorize the software instance to run under the license agreement. The ephemeral license keys (which can be similar to the structure of the master key) can be derived from the master key using any desired algorithm. Other parameters used for generating the ephemeral license keys can include an instance identification, the customer account number 114 and/or a time-to-live parameter. Generally, the time-to-live parameter is a time limit associated with each ephemeral license and is shorter in duration than that of the master license. However, the ephemeral license can also expire at a same time as the master license. Having ephemeral licenses that expire prior to the time limits of the master key ensures that the licensing service has control over the licenses issued because they can be revoked (or not renewed) when the ephemeral license expires.

The dynamic licensing scheme has one or more of the following advantages. First, it ensures only one copy of the license is active as the pool of licenses is tied to a customer account number. Thus, if a different customer attempts to obtain a license, that unlicensed customer can be blocked. Second, the license is only valid for the duration of the license agreement, which can be easily enforced by short-term renewal requirements of the ephemeral license. Third, autoscaling is supported because additional ephemeral licenses can be provisioned from the pool 110 at any time without the need to issue a new master key 112. Additionally, as shown at 130, a software application instance that no longer needs a license can release the license and return the license to the pool of licenses available. Other advantages are discussed further below.

Figure 2:
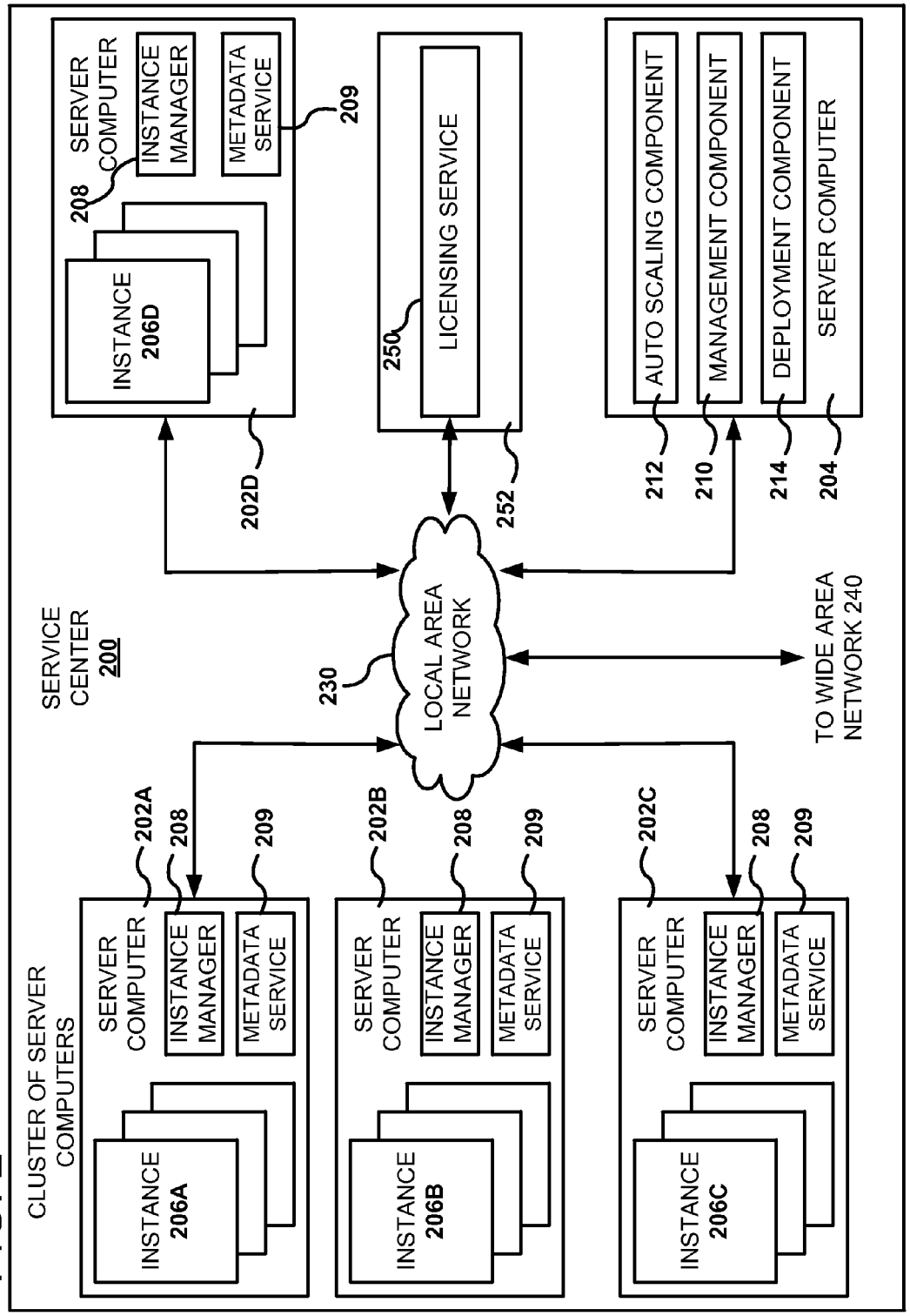
FIG. 2 is an example system diagram showing a plurality of virtual machine instances that can be used in conjunction with a licensing service.

FIG. 2 is a computing system diagram of a network-based service center 200 that illustrates one configuration that can be used for the embodiments described herein. By way of background, the service center 200 is capable of delivery of computing and storage capacity as a service to a community of end recipients. Generally speaking, the service center 200 can provide the following models: infrastructure as a service, platform as a service, and/or software as a service. Other models can be provided. For the infrastructure as a service model, the service center 200 can offer computers as physical or virtual machines and other resources. The virtual machines can be run as guests by a hypervisor, as described further below. The platform as a service model delivers a computing platform can include an operating system, programming language execution environment, database, and web server. Application developers can develop and run their software solutions on the service center platform without the cost of buying and managing the underlying hardware and software. The software as a service model allows installation and operation of application software in the service center. In some embodiments, end users access the service center 200 using networked client devices, such as desktop computers, laptops, tablets, smartphones, etc. running web browsers or other lightweight client applications. Those skilled in the art will recognize that the service center 200 can be described as a "cloud" environment.

The particular illustrated service center 200 includes a plurality of server computers 202A-202D. While only four server computers are shown, any number can be used, and large centers can include thousands of server computers. The server computers 202A-202D can provide computing resources for executing software instances 206A-206D. In one embodiment, the instances 206A-206D are virtual machine instances. As known in the art, a virtual machine instance is an instance of a software implementation of a machine (i.e. a computer) that executes applications like a physical machine. In the example of virtual machine instances, each of the servers 202A-202D can be configured to execute an instance manager 208 capable of executing the instances. The instance manager 208 can be a hypervisor or another type of program configured to enable the execution of multiple instances 206 on a single server. Additionally, each of the instances 206 can be configured to execute one or more applications.

Each of the server computers 202 can have an associated metadata service 209. The metadata service 209 can obtain instance-specific metadata, such as an account identification, a unique identifier of the software application instance, a configuration of the software application instance, an instance type, MAC address, geographic region in which the software application instance is executing, etc. Any desired metadata attributes can be obtained to provide further information about the environment or configuration of the software application instance. Although shown locally on the server computers 202, the metadata service can be positioned on a separate server, such as server 204.

It should be appreciated that although the embodiments disclosed herein are described primarily in the context of virtual machine instances, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

A server computer 204 can be reserved for executing software components for managing the operation of the server computers 202 and the instances 206. For example, the server computer 204 can execute a management component 210. A customer can access the management component 210 to configure various aspects of the operation of the instances 206 purchased by the customer. For example, the customer can purchase, rent or lease instances and make changes to the configuration of the instances. The customer can also specify settings regarding how the purchased instances are to be scaled in response to demand. An auto scaling component 212 can scale the instances 206 based upon rules defined by the customer. In one embodiment, the auto scaling component 212 allows a customer to specify scale-up rules for use in determining when new instances should be instantiated and scale-down rules for use in determining when existing instances should be terminated. The auto scaling component 212 can consist of a number of subcomponents executing on different server computers 202 or other computing devices. The auto scaling component 212 can monitor available computing resources over an internal management network and modify resources available based on need.

A deployment component 214 can be used to assist customers in the deployment of new instances 206 of computing resources. The deployment component 214 can receive a configuration from a customer that includes data describing how new instances 206 should be configured. For example, the configuration can specify one or more applications to be installed in new instances 206, provide scripts and/or other types of code to be executed for configuring new instances 206, provide cache logic specifying how an application cache should be prepared, and other types of information. The deployment component 214 can utilize the customer-provided configuration and cache logic to configure, prime, and launch new instances 206. The configuration, cache logic, and other information may be specified by a customer using the management component 210 or by providing this information directly to the deployment component 214. Other mechanisms might also be utilized to configure the operation of the deployment component 210.

The service center 200 can also include a licensing service 250. The licensing service can be positioned on a separate server 252 or can be executed on server computer 204. In any event, the licensing service 250 can generate a plurality of ephemeral licenses, such as is shown in FIG. 1. The licenses can authorize instances 206 or applications running on those instances to be executed and used in accordance with a license. As further described below, the licensing service can further allow a customer to organize licenses into groups that align with application tiers, allow ephemeral licenses to be updated regularly, and track actual usage of licenses per product. The ephemeral licenses can allow a customer to license, rent, or lease software on a pay-as-you-go basis so that the customer can only pay for what they use. The time fragments of such use can be divided into minutes. Additional features can also be provided.

A network 230 can be utilized to interconnect the server computers 202A-202D and the server computer 204, 252. The network 230 can be a local area network (LAN) and can be connected to a Wide Area Network (WAN) 240 so that end users can access the service center 200. It should be appreciated that the network topology illustrated in FIG. 2 has been simplified and that many more networks and networking devices can be utilized to interconnect the various computing systems disclosed herein.

Figure 3:
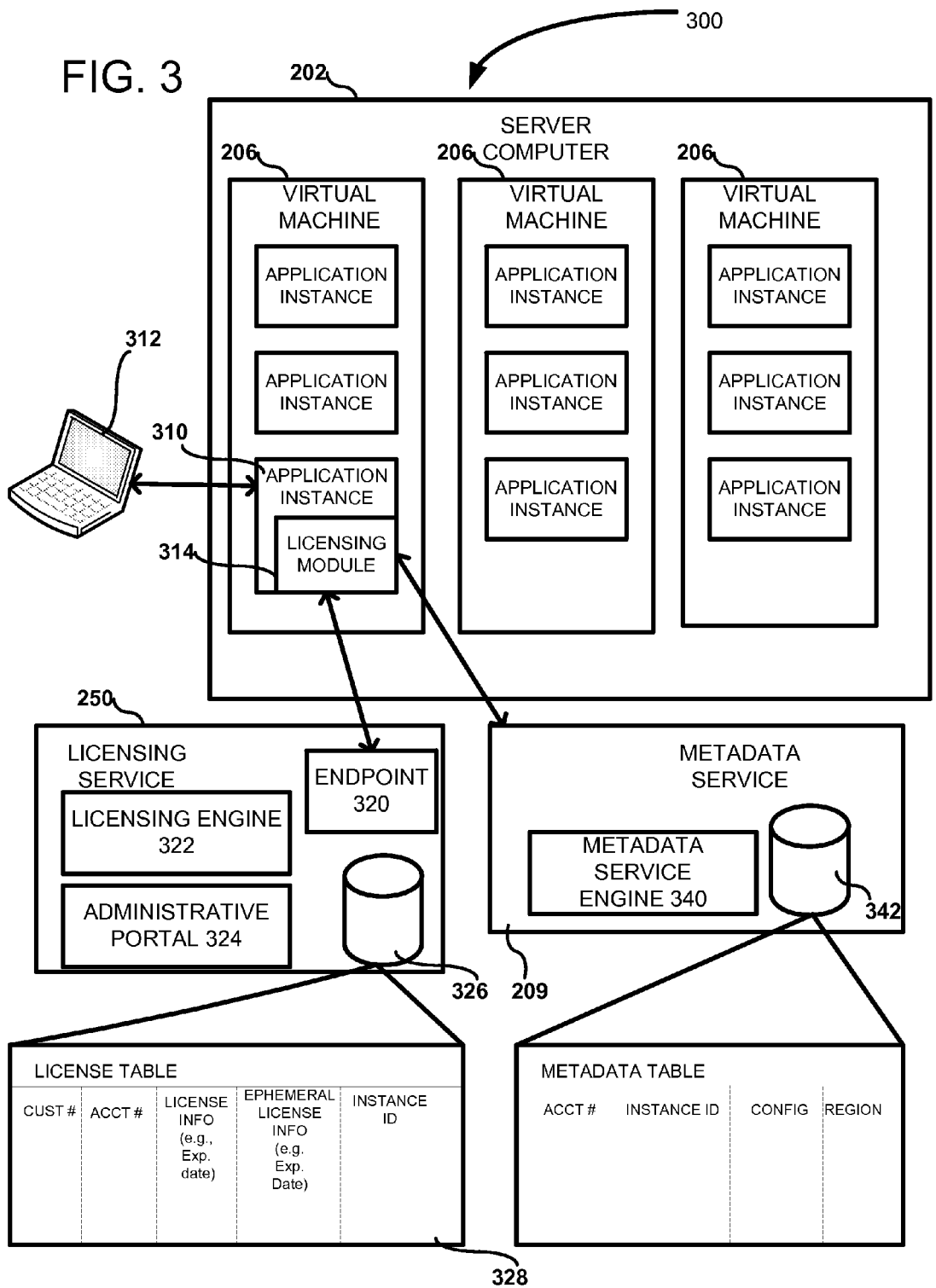
FIG. 3 illustrates an example system diagram wherein an application instance includes a licensing module for communicating with the licensing service.

FIG. 3 shows additional details of an example structure 300 for the licensing service 250 and the metadata service 209. In the illustrated embodiment, a server computer 202 can be one of the server computers from the service center 200. The server computer 202 can include a plurality of virtual machine instances 206. The virtual machines can be executing one or more application instances, such as application instance 310. As previously described, the application instance can be accessed through networks (e.g., the WAN 240 and LAN 230 of FIG. 2) by a client computer 312, although such networks are not shown for simplicity. The application instance 310 can include a licensing module 314 that communicates with the licensing service 250 through an endpoint 320. The licensing service 250 can include a licensing engine 322, an administrative portal 324, and a database 326. The licensing engine 322 includes logic for performing methods discussed in flowcharts described herein. The administrative portal 324 can allow access to the licensing service 250 by the licensor and/or the licensee depending on the design. Some features that can be implemented by the licensing service 250 through the administrative portal include the ability for a licensee to access the database 326 in order to organize their licenses into groups and track actual usage of the licensed applications. The licensor can further dynamically modify a number of licenses allowed in a license pool so as to promote autoscaling of the application instances. The database can include a licensing table 328 having a plurality of fields. The example illustrated fields include a customer number, an account number, license information (e.g., master key number, expiration date, etc.), ephemeral license information (e.g., ephemeral license numbers, expiration dates, etc.), an instance identification, etc. Thus, the licensing table can include the information needed to provision an ephemeral license to the application instance 310 through the licensing module 314. The database 326 can also include information regarding a pool of licenses from which the ephemeral licenses are pulled and provisioned.

The licensing module 314 can further communicate with the metadata service 209. The metadata service can include a metadata service engine 340 and a database 342. The metadata service engine can receive a metadata request from the licensing module and respond with identification information of the application instance 310. For example, the identification information can include attributes associated with an environment in which the software application instance is executing. Example attributes can include one or more of the following: an account identification, a unique identifier of the software application instance, a configuration of the software application instance, a geographic region in which the software application instance is executing, etc.

As described further below, the application instance 310 can revalidate its ephemeral license at predetermined time intervals by periodically communicating with the licensing service 250 using its identification information and requesting a new ephemeral license or otherwise an updated expiration date to its existing ephemeral license. The licensing service 250 can track whether the master license is still valid and whether sufficient licenses remain in the license pool to issue or renew the ephemeral license. The identification information of the application instance 310 can be associated with the ephemeral license and the customer account number to readily track license use. Applications executing outside of the service center 200 can have limited or no access to the metadata service 209 and licensing service 250, which ensures that only applications within the service center can obtain licenses. Autoscaling is promoted by allowing issuance of ephemeral licenses up to a license pool limit, which can be readily modified by a licensor.

Figure 4:
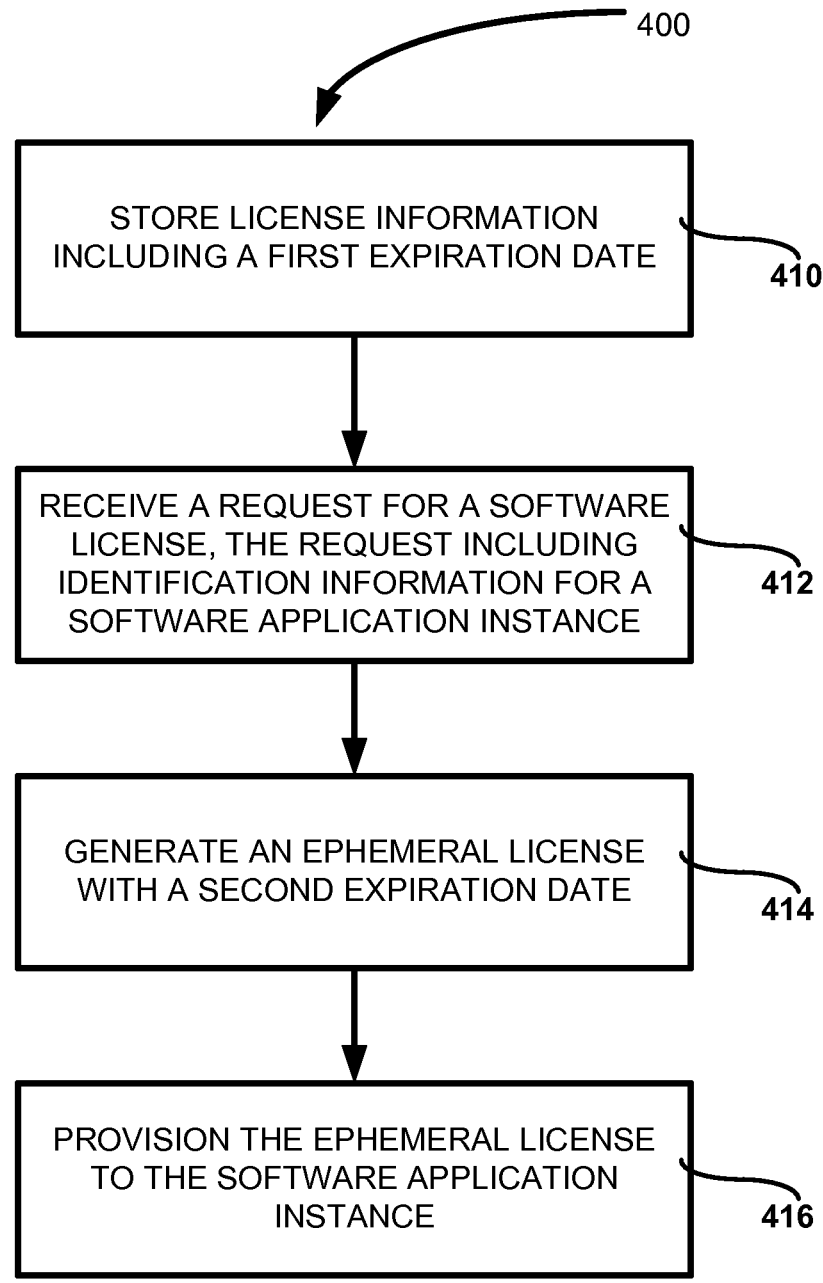
FIG. 4 is an example flowchart of an embodiment for dynamically provisioning an ephemeral license to a software application instance.

FIG. 4 shows an example flowchart 400 of a method for dynamically provisioning an ephemeral license to a software application instance that can be performed by the licensing service 250. In process block 410, license information can be stored including a first expiration date. For example, the license information can be associated with a master key number for the license and its associated expiration date. As already described, the license information can be stored in the license table 328 of FIG. 3. In process block 412, a request can be received by the licensing service for a software license. A software application instance can request a license through an API call to the licensing service using instance identification information as a parameter. The instance identification information can include a unique identifier associated with the software application instance. In process block 414, the licensing service can generate an ephemeral license with a second expiration date, different than the first expiration date associated with the master key.

Generally, the second expiration date expires prior to the first expiration date so that the software application instance needs to renew the ephemeral license multiple times prior to the expiration of the license. Multiple schemes can be used for generating the new expiration date, but in one example, a fixed time duration from the request (e.g., two weeks) can be used. The second expiration date associated with the ephemeral license can be called a time-to-live parameter. In process block 416, the ephemeral license can be provisioned to the software application instance. For example, provisioning can include passing an ephemeral license key to the software application instance together with the time-to-live parameter. The ephemeral license key can then be used by the software application instance to revalidate the license with the licensing service. Generation of the ephemeral key can take a variety of forms and depends on the desired design. One potential implementation can use one or more parameters in the license table. For example, the master license key, the time-to-live parameter and the instance identification can all be used as parameters in a generation algorithm that outputs a unique ephemeral key value.

Figure 5:
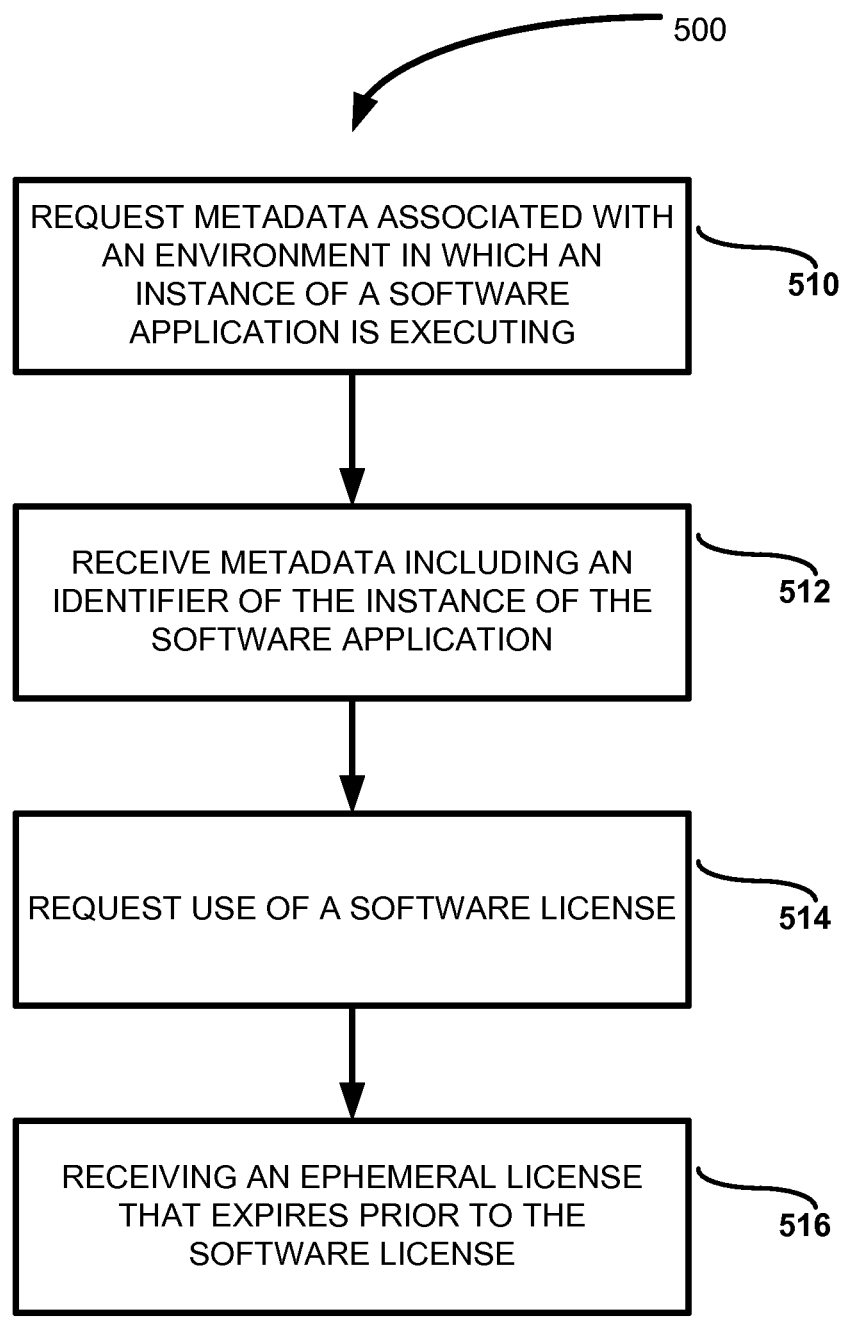
FIG. 5 is an example flowchart for requesting a license from a perspective of a software application instance.

FIG. 5 shows an embodiment of a flowchart 500 for requesting a license from a perspective of a software instance. In process block 510, a request can be made for metadata associated with an environment in which the instance is executing. For example, the software application instance can use the metadata service to obtain information about itself, such as its' unique identifier. Other information can also be obtained such as its configuration (memory type, processor type, etc.), geographic region (e.g., Northeast or State), etc. In process block 514, a request can be made for a license to the licensing service. The request can include one or more of the received metadata parameters. Using the request, the licensing service can access the licensing table and obtain information about the software application instance making the request, such as whether the master license has expired and whether an ephemeral license can be provisioned. Assuming a valid license is available, in process block 516, the software application instance can receive an ephemeral license that expires prior to the master license. Generally, receiving an ephemeral license includes receiving a key that can be used to revalidate the software application instance so that it can continue to operate under license.

Figure 6:
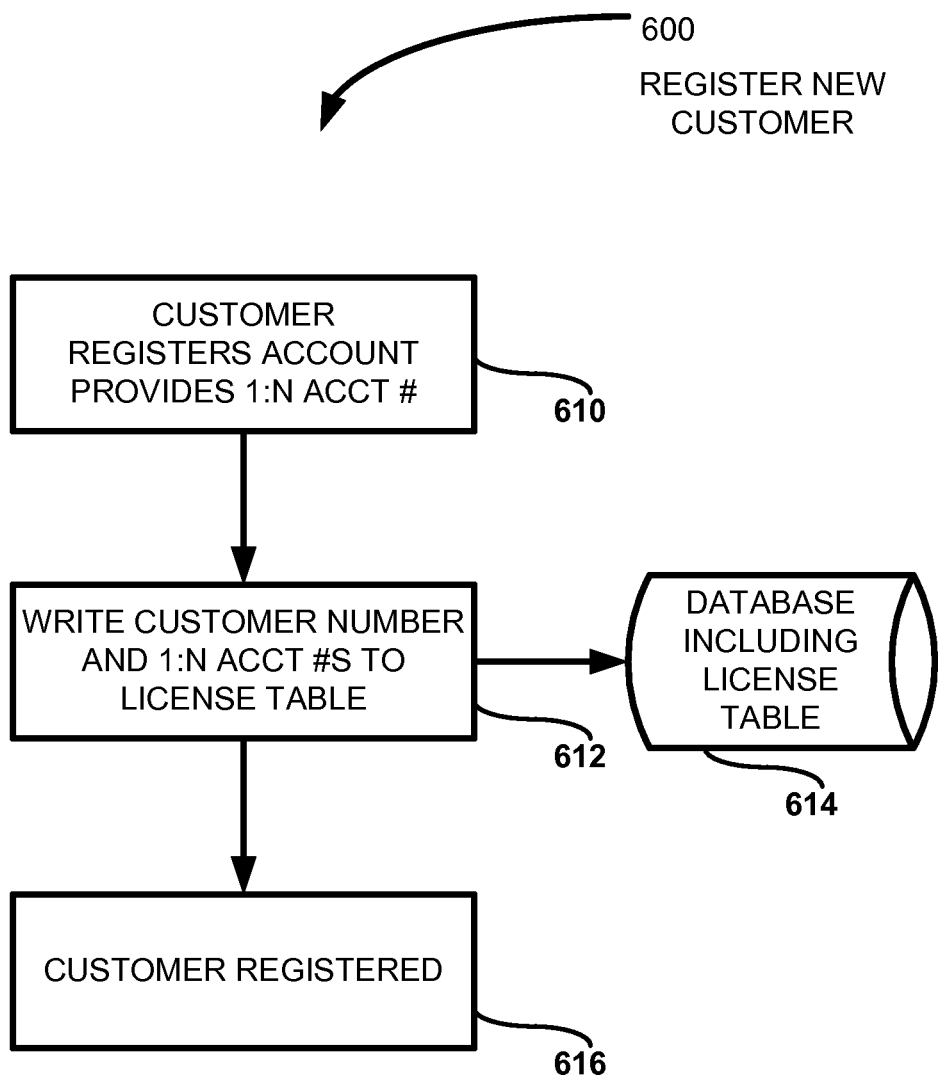
FIG. 6 is an example flowchart for registering a customer and associating a customer number to one or more licenses.

FIG. 6 illustrates a basic flowchart 600 for registering a customer and associating a customer number to one or more licenses, which can be performed by the licensing service 250. There are a variety of schemes that can be used for customer and account numbers. A typical structure has a customer number and multiple account numbers that are associated with the customer number. Thus, a customer can open as many accounts as desired so that different software licenses can be obtained. In process block 610, a customer can register to obtain a customer number and obtain 1–N account numbers. In process block 612, the customer number and account numbers are written to a database 614 and incorporated into the license table 328 (FIG. 3). At process block 616, the customer is registered and can be presented with an acknowledge message.

Figure 7:
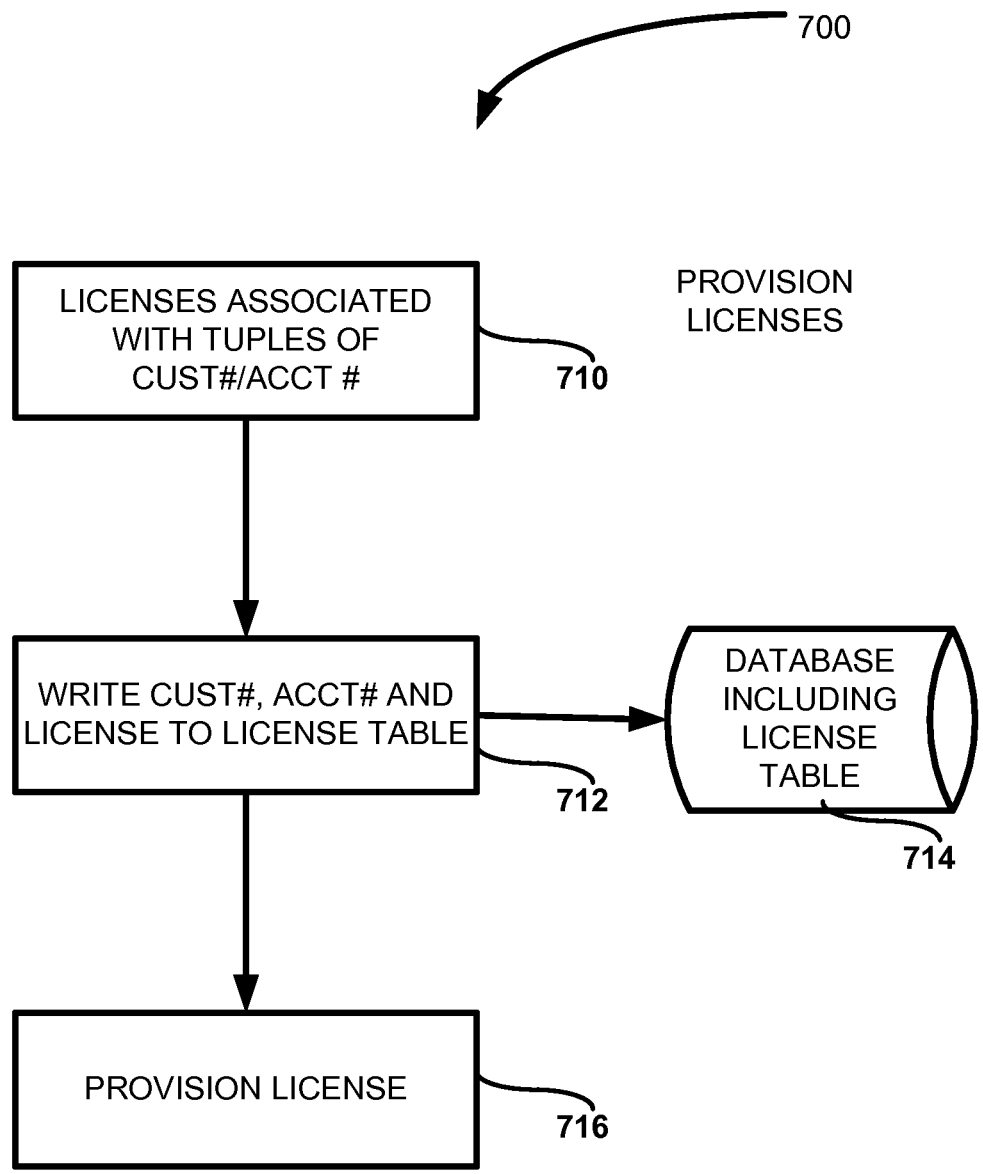
FIG. 7 is an example flowchart for provisioning a license to a software application instance.

FIG. 7 is a flowchart 700 for provisioning a license to a software application instance. In process block 710, one or more license information can be received from a licensor. The license information can include a master license key and tuples of customer and account numbers. In process block 712, the customer number and account numbers can be copied to a database 714 including the licensing table 328. In process block 716, ephemeral licenses can be provisioned to the software application instances upon requests received from the one or more software application instances.

Figure 8A:
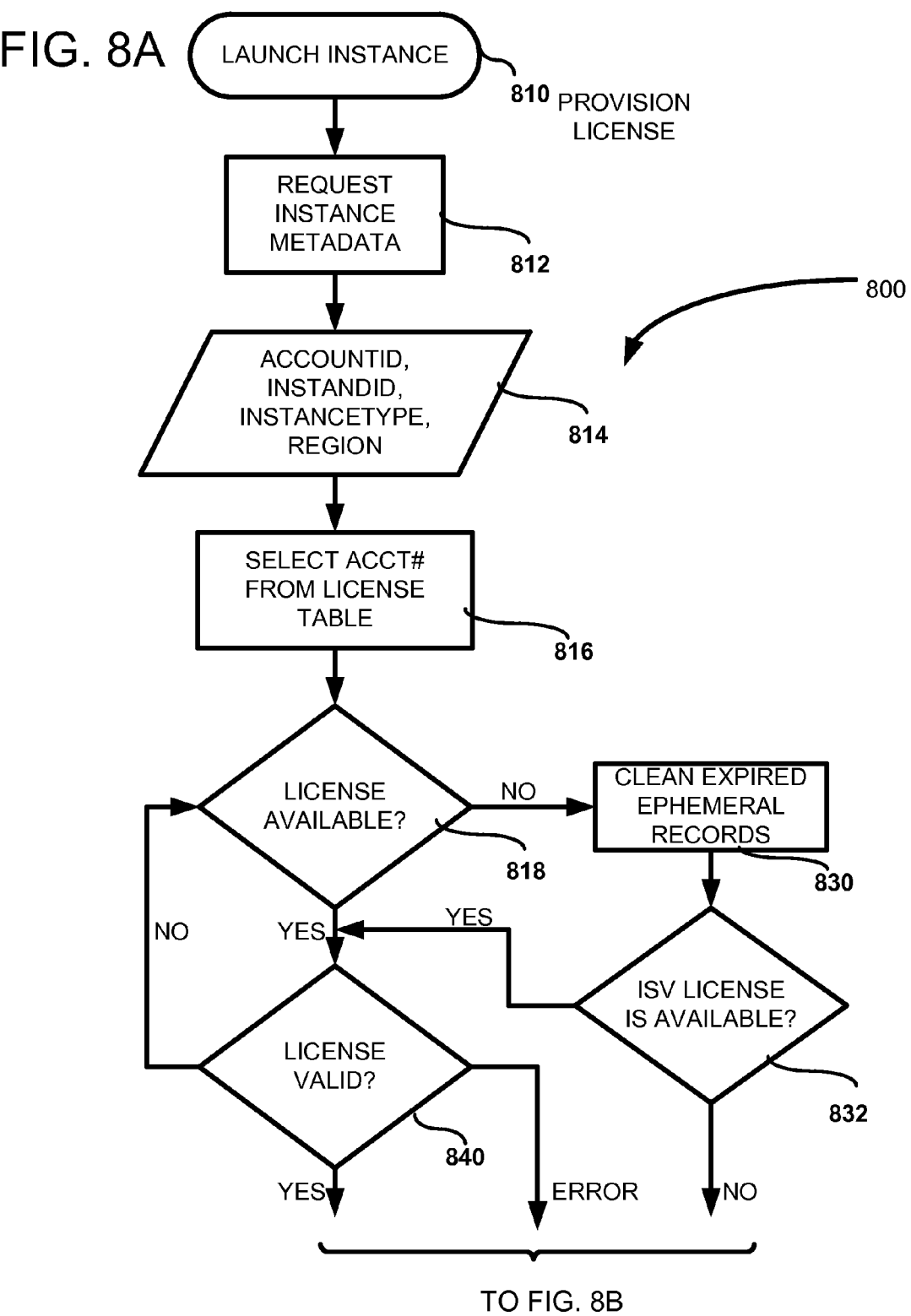
FIGS. 8A and 8B are detailed flowcharts of an embodiment for provisioning an ephemeral license to a software application instance.
Figure 8B:
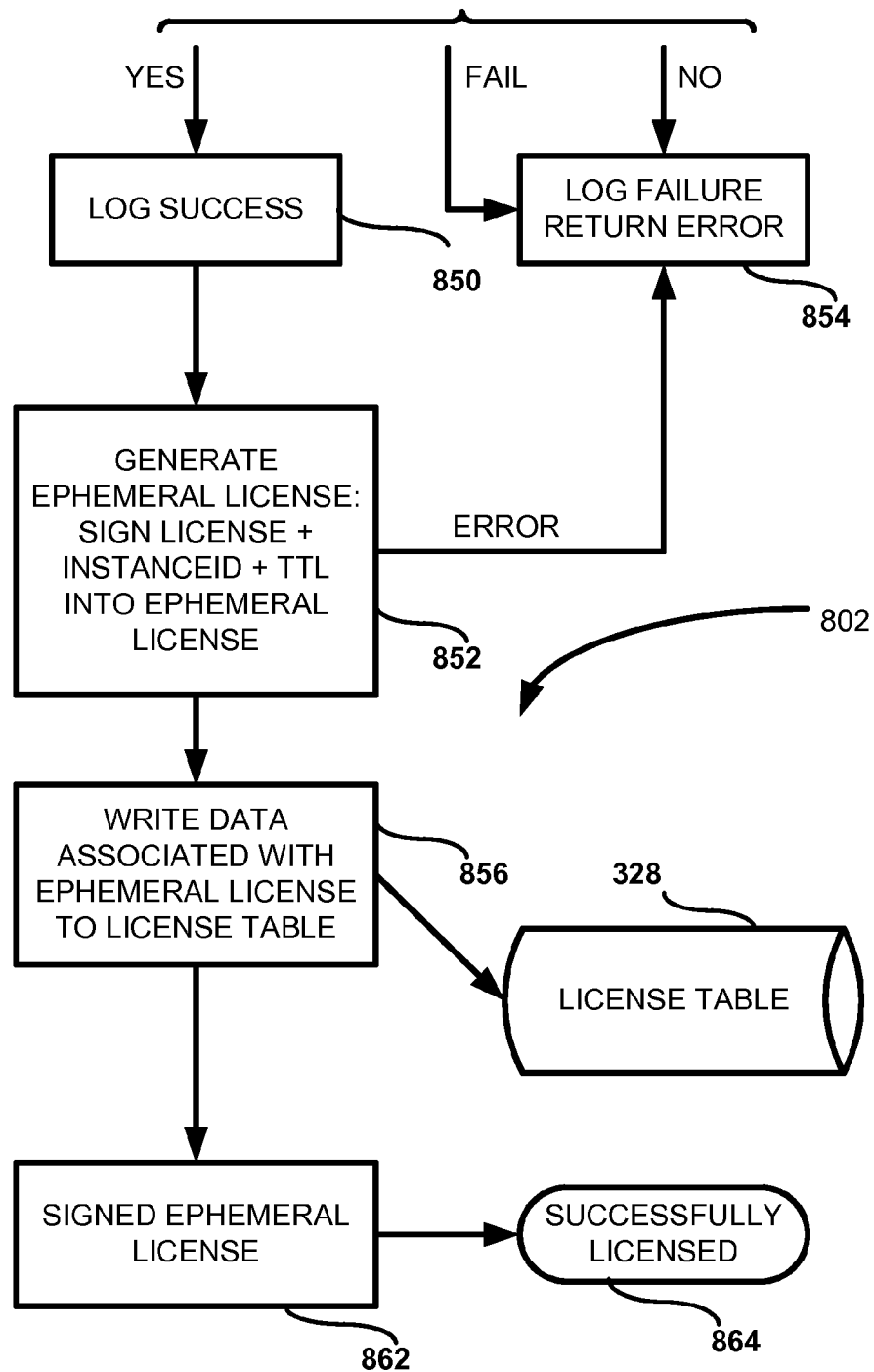

FIGS. 8A and 8B are detailed flowcharts 800, 802 of an embodiment for provisioning an ephemeral license to a software application instance. In process block 810, an instance of a software application can be launched or initiated, such as on one of the server computers 202 (FIG. 2) in the service center 200. In process block 812, the software application instance can request metadata associated with itself from the metadata service 209. At 814, the metadata can be passed to the licensing service 250 including an account identification associated with the instance, a unique identification for the software application instance, an instance type (i.e., configuration), and a region. In process block 816, the account identification is used to access a license table 328. At decision block 818, a check is made to determine whether a license is available from the pool of available licenses using information from the licensing table. If not, at 830, ephemeral licenses that have been released or otherwise expired are cleaned from the license table, which can result in increasing a number of available licenses in the pool of licenses. At decision block 832, the license table is again checked to see whether a license is available. If decision block 818 or decision block 832 were answered in the affirmative, then, in decision block 840, a determination is made whether the available license is valid. If decision blocks 832 or 840 are answered in the negative, then there is an error, which is logged and an error message is returned to the application instance that requested the license. Otherwise, at process block 850, the success is logged. At process block 852, an ephemeral license key is generated which is derived from the master license key, the instance identification, and the time-to-live parameter. In process block 856, the license table 328 is updated to include the data associated with the ephemeral license including the ephemeral license key and the time-to-live parameter. Other metadata associated with the ephemeral license can also be copied to the licensing table. At process block 862, the ephemeral license key is transmitted to the software application instance, which can use the key to successfully license the software, as shown at 864.

FIG. 9 shows a flowchart 900 for releasing a license from a license pool. This flow can be executed periodically (e.g., daily, weekly, monthly, etc.) by the licensing module 314 to continuously re-validate ephemeral licenses and ensure that the license is still valid. The license validation can be initiated at 910, which can be a procedure call within an instance 206. At process block 912, the ephemeral license is released. Releasing the license can be an API call from the instance 206 (particularly, the licensing module 314) to the licensing service 250. By releasing the ephemeral license, the license pool in incremented in terms of licenses available. In process block 914, the license table 328 is modified to remove the ephemeral license and its associated metadata. At process block 916, the successful release of the ephemeral license is logged. At process block 918, the instance 206 can then initiate checking out a new ephemeral license from the license pool. For example, the instance can enter the flow of FIG. 8 at process blocks 812 or 816 to obtain a new license. Returning to process block 912, if it is determined that by releasing the license that a new license cannot be issued, then an error condition can be generated wherein a check is made at decision block 930 whether the ephemeral license being released has expired. If not, at decision block 932, a check can be made to confirm that the identification associated with the software application instance matches with the identification in the licensing table. If the ephemeral license has expired then at process block 934, a failure is logged and an error returned. If the ephemeral license has not yet expired, and the instance identification matches, then at 936 the ephemeral license can continue by either issuing the same ephemeral key or a new ephemeral key. Depending on the design, a new expiration date can be issued or the same expiration date can be maintained. In any event, the licensing table can be updated.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer. As should be readily understood, the term computer-readable storage media does not include communication connections, such as modulated data signals.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an Intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method for dynamically licensing software, comprising:
    storing license information associated with a license to use software, the license information including a master license expiration date associated with a master key;
    receiving a request for use of the license from a software application instance, the request including metadata associated with the software application instance, the metadata having been retrieved by the software application instance through a request to a metadata service and the metadata including identification information of the software application instance so that the software application instance retrieves its own identification information from the metadata service;
    using the metadata, including the identification information of the software application instance, and the master key, generating an ephemeral license together with a time-to-live parameter, the time-to-live parameter making it so that the ephemeral license expires prior to the master license expiration date;
    provisioning, from a server computer, the ephemeral license to the software application instance to authorize use of the software under the license; wherein the ephemeral license is a first license and at least a second ephemeral license is generated using the master key so that a plurality of ephemeral licenses are generated using the same master key, the ephemeral licenses being in a license pool associated with the master key, and a number of the ephemeral licenses is dynamically modifiable by a licensor.

2. The method of claim 1, wherein the metadata includes one or more of the following parameters associated with the software application instance: a customer account number, a unique identifier of the software application instance, a configuration of the software application instance, or a geographic region in which the software application instance is executing.

3. The method of claim 1, wherein generating the ephemeral license includes generating an ephemeral license key using a key-generation algorithm that receives as parameters a master key, a unique identifier associated with the software application instance, and the time-to-live parameter.

4. The method of claim 1, wherein the ephemeral license is renewed multiple times prior to the master license expiration date.

5. A method for licensing software, comprising:
    storing license information associated with a license to use software, the license information including a first expiration date and a number of instances that are available to use the license in a license pool;
    receiving a request for use of the license from a software application instance, the request including identification information of the software application instance, wherein the software application instance obtained the identification information through a request to a service separate from the software application instance;
    using the identification information, generating, on a server computer, an ephemeral license together with a second expiration date, different than the first expiration date;
    provisioning, using a server computer, the ephemeral license to the software application instance to authorize use of the software under the license;
    modifying the number of licenses available in the license pool in response to provisioning the ephemeral license; and
    receiving from the software application instance a request to release the license and returning the license to the license pool.

6. The method of claim 5, wherein the identification information includes attributes associated with an environment in which the software application instance is executing.

7. The method of claim 6, wherein the attributes include one or more of the following: an account identification, a unique identifier of the software application instance, a configuration of the software application instance, or a geographic region in which the software application instance is executing.

8. The method of claim 5, wherein the second expiration date expires prior to the first expiration date so that the software application instance needs to renew the ephemeral license multiple times prior to the first expiration date.

9. The method of claim 5, wherein the license information includes a master key associated with the license and generating the ephemeral license includes generating an ephemeral key different than the license key.

10. The method of claim 9, wherein the ephemeral key is generated using a key-generation algorithm that receives as parameters the master key, a unique identifier associated with the software application instance, and the first expiration date.

11. The method of claim 5, further including receiving a request from the software application instance for metadata related to an environment in which the software application instance is running, and wherein the metadata includes the identification information associated with the software application instance.

12. The method of claim 5, further including storing log information associated with the ephemeral license.

13. The method of claim 5, further including receiving periodic requests for updating the ephemeral license and generating new ephemeral licenses in response to the requests with new expiration dates prior to the first expiration date.

14. The method of claim 5, wherein the software application instance includes a licensing module that communicates with a licensing service to receive the ephemeral license.

15. The method of claim 14, wherein the licensing module cannot access the licensing service unless it is executing on a server computer in a virtual environment containing the license service.

16. The method of claim 5, wherein the software application instance is executing in a virtual machine and wherein the ephemeral license is checked out from the license pool including a predetermined number of licenses to allow for autoscaling of a number of licenses issued.

17. The method of claim 5, further including associating the ephemeral license to a customer number so that only a customer associated with the customer number can execute the software application instance.

18. A method for dynamically licensing software, comprising:
    requesting, to a first server computer, metadata associated with an environment in which an instance of a software application is executing in a virtual machine, the requesting being generated by the instance of the software application itself, including asking for its own identification;
    in response to the requesting, receiving the metadata from the first server computer including an identifier of the instance of the software application;
    using a second server computer upon which the instance of the software application is executing, requesting use of a software license, wherein the metadata is included in the request; and
    in response to the request, receiving an ephemeral license from a third server computer that expires prior to the software license.

19. The method of claim 18, wherein the metadata further includes an account number, a configuration of the instance of the software application and a geographic region in which the instance is being executed.

20. The method of claim 18, wherein the software license is associated with a master key and further including receiving an ephemeral key that is different than the master key.

21. The method of claim 18, further including using the identifier to access a table to determine if the software license is still available and valid.

22. A system for licensing software, comprising:
    a data store for storing a license table including a customer number and license information associated with the customer number;
    a metadata service, executing on a first server computer, configured to receive a request from a software application instance, executing on a second server computer, and return instance metadata including attributes associated with an environment in which the software application instance is executing, wherein the software application instance furthermore receives its own identification from the metadata service; and
    a licensing service, executing on a third server computer, configured to receive a request, including the instance metadata and including the identification of the software application instance, from the software application instance to provision a license to use the software application instance, wherein the licensing service uses a master key, associated with the customer number and having a first expiration date, to provision multiple licenses that have expiration dates different than the first expiration date.

23. The system of claim 22, wherein the licensing service is configured to generate an ephemeral license to be renewed multiple times during a time period of the license.

24. The system of claim 22, wherein the licensing service is configured to update the license table with log information whenever an ephemeral license is renewed.

25. A computer-readable storage including instructions thereon for executing a method for licensing software, the method comprising:
    receiving information identifying a particular instance of software running on a virtual machine, the information including an identifier of the instance of software that the instance of software requested from an external service;
    generating an ephemeral license that is associated with a software license having a first expiration date, but that includes a time-to-live parameter indicating a duration of the ephemeral license, the ephemeral license having a second expiration date which is different than the first expiration date;
    provisioning, using a licensing service on a server computer, the ephemeral license to the particular instance of software to authorize use of the software under the license; and
    the licensing service allowing a licensor to dynamically modify a license pool controlling a number of ephemeral licenses that can be generated under the software license.

26. The computer-readable storage of claim 25, further including storing a maximum number of ephemeral licenses that can be issued in association with the software license and tracking a current number of ephemeral licenses issued to allow for autoscaling of instances of software that can use the software license.

27. The computer-readable storage of claim 25, further including checking an account number of a customer associated with the instance of software and determining if the software license is valid for that customer.

28. The computer-readable storage of claim 27, wherein if the software license is not valid, terminating or blocking the instance of software from executing.

29. The computer-readable storage of claim 25, wherein the time-to-live parameter ensures that the ephemeral license is renewed multiple times during a life of the software license.

* * * * *